United States Patent
Kubo (10) Patent No.: US 11,125,999 B2
(45) Date of Patent: Sep. 21, 2021

(54) POLARIZATION PLATE, IMAGE DISPLAY DEVICE USING SAME, AND MOBILE BODY

(71) Applicant: KYOCERA Corporation, Kyoto (JP)

(72) Inventor: Yoshinori Kubo, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 239 days.

(21) Appl. No.: 16/326,831

(22) PCT Filed: Jun. 29, 2018

(86) PCT No.: PCT/JP2018/024833
§ 371 (c)(1),
(2) Date: Feb. 20, 2019

(87) PCT Pub. No.: WO2019/004435
PCT Pub. Date: Jan. 3, 2019

(65) Prior Publication Data
US 2019/0196203 A1    Jun. 27, 2019

(30) Foreign Application Priority Data

Jun. 29, 2017  (JP) ............................. JP2017-127396

(51) Int. Cl.
| | | |
|---|---|---|
| *G02B 27/14* | (2006.01) | |
| *G02B 27/01* | (2006.01) | |
| *G02F 1/1335* | (2006.01) | |
| *G02B 5/30* | (2006.01) | |
| *G02B 1/02* | (2006.01) | |

(52) U.S. Cl.
CPC ........... *G02B 27/0172* (2013.01); *G02B 1/02* (2013.01); *G02B 5/3033* (2013.01); *G02B 5/3058* (2013.01); *G02F 1/1335* (2013.01); *G02F 1/133528* (2013.01); *G02B 2027/0118* (2013.01)

(58) Field of Classification Search
CPC .... G02B 27/0172; G02B 1/02; G02B 5/3033; G02B 5/3058; G02B 2027/0118; G02F 1/1335; G02F 1/133528
USPC ................ 359/485.03, 485.05, 630; 345/7–9
See application file for complete search history.

(56) References Cited

U.S. PATENT DOCUMENTS

| RE45,642 E | 8/2015 | Takada |
| 2002/0191287 A1 | 12/2002 | Miyazawa et al. |
| 2005/0190445 A1 | 9/2005 | Fukuzaki |

(Continued)

FOREIGN PATENT DOCUMENTS

| JP | 2003-215344 A | 7/2003 |
| JP | 2005-242080 A | 9/2005 |
| JP | 2008-216957 A | 9/2008 |

(Continued)

OTHER PUBLICATIONS

Kawano et al., Surface Plasmon Resonance on the Sapphire Single Crystal Substrates with 3D Nano-Textured Surface, Surface Science vol. 32, No. 1, pp. 45-51, 2011, Received in Apr. 26, 2010, 7 pages.

(Continued)

*Primary Examiner* — William Choi
(74) *Attorney, Agent, or Firm* — Procopio, Cory, Hargreaves & Savitch LLP (57) ABSTRACT

A polarization plate includes a sapphire plate having a first main surface, and a thin metal wire disposed in a stripe pattern on the first main surface of the sapphire plate. The polarization plate has an angle of 5° or less between a c-axis of the sapphire plate and a longitudinal direction of the thin metal wire.

19 Claims, 5 Drawing Sheets

(56) References Cited

U.S. PATENT DOCUMENTS

2015/0177431 A1  6/2015  Umehara et al.
2018/0299602 A1  10/2018 Takeda et al.

FOREIGN PATENT DOCUMENTS

| JP | 2012-118438 A | 6/2012 |
| JP | 2015-75746 A | 4/2015 |
| JP | 2015-136091 A | 7/2015 |
| JP | 2016-24419 A | 2/2016 |
| WO | 2017/073044 A1 | 5/2017 |

OTHER PUBLICATIONS

Shinkosha Co., Ltd., Shinkosha Sapphire Substrate Technical Material, Issued on Dec. 26, 2009, Patent JP2019-527063, 4 pages.

c-plane
c-axis

FIG. 5(b)

m-plane
m-axis

FIG. 5(c)

a-plane
a-axis

FIG. 5(d)

r-plane
r-axis

– 1 –

POLARIZATION PLATE, IMAGE DISPLAY DEVICE USING SAME, AND MOBILE BODY

TECHNICAL FIELD

The present disclosure relates to a polarization plate used for an image display device such as a projector device or a head-up display device, an image display device using the polarization plate, and a mobile body.

BACKGROUND ART

An image display device, such as a projector device (PJ device) or a head-up display device (HUD device), projects visual information displayed on an image forming part, such as a liquid crystal panel, onto a wall, a screen, a window, or the like, by using a light source and various optical elements, so as to enable a user to perceive the visual information.

Patent Document 1 discloses a wire grid polarizer with a transparent substrate formed of crystal or sapphire. Patent Document 2 discloses a wire grid polarizer formed on a glass plate as a polarization plate available for use in a visible light region, the wire grid polarizer having a thin metal wire period of 150 nm, a height of 200 nm, and a width of 60 nm.

With a demand for smaller size, higher definition, and higher brightness of an image display device, and an increase in output from a light source accompanied with the demand, heat resistance has increasingly been required of a polarization plate. In a case of a device for outdoor use, such as an on-vehicle HUD device, heat generated by incident sunlight is another concern in addition to heat from a light source.

RELATED ART DOCUMENT

Patent Document

Patent Document 1: JP 2008-216957 A
Patent Document 2: JP 2016-24419 A

SUMMARY OF THE INVENTION

A polarization plate of the present disclosure includes a sapphire plate having a first main surface, and a thin metal wire disposed in a stripe pattern on the first main surface of the sapphire plate. The polarization plate has an angle of 5° or less between a c-axis of the sapphire plate and a longitudinal direction of the thin metal wire.

EMBODIMENTS FOR CARRYING OUT THE INVENTION

Figure 1:
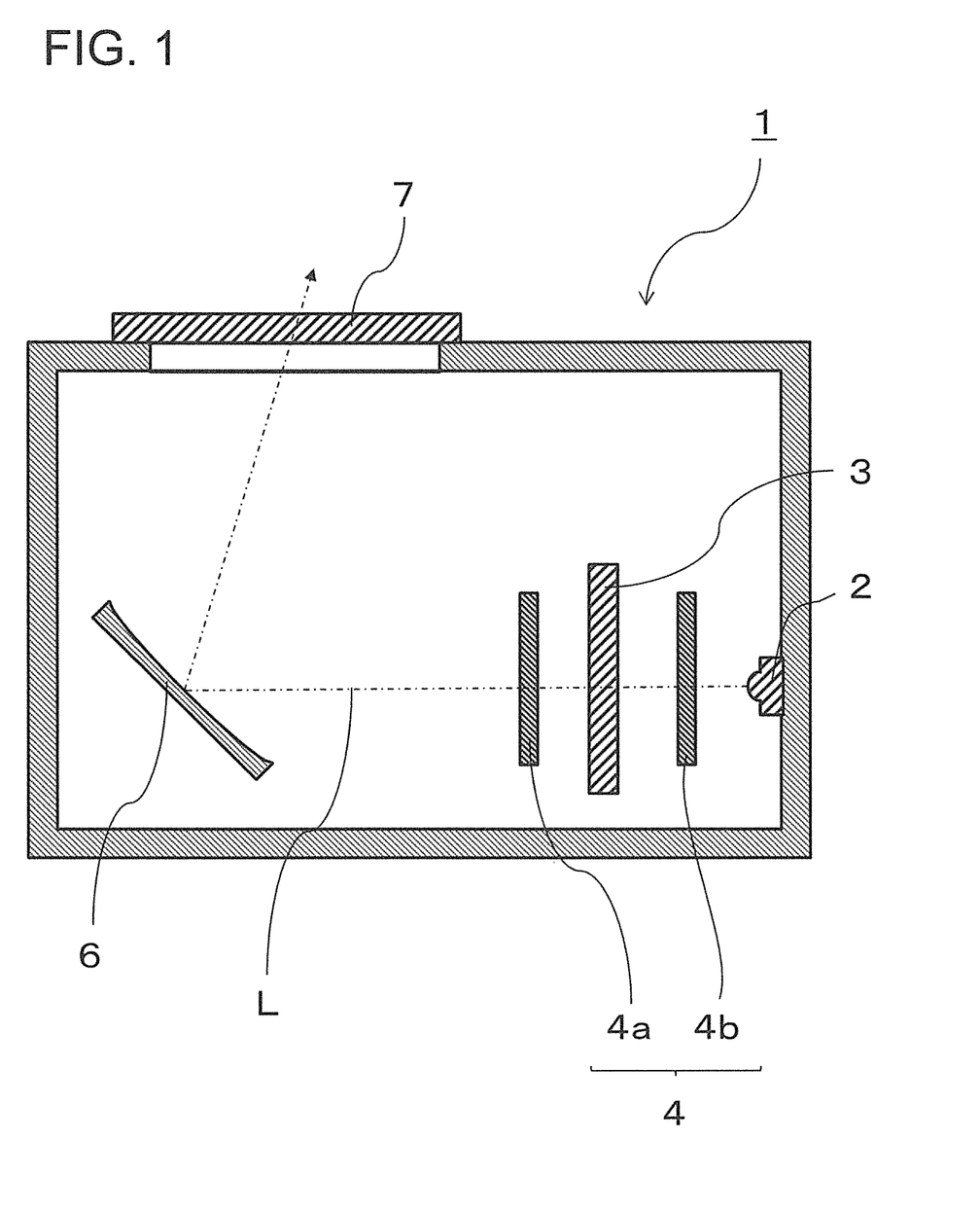
FIG. 1 is a schematic diagram of an image display device using a polarization plate according to a first embodiment.

A polarization plate of the present disclosure and an image display device using the polarization plate will be described, in a case of a HUD device as an example, with reference to the drawings. FIG. 1 is a schematic diagram of a HUD device 1 corresponding to an image display device 1 according to a first embodiment.

The HUD device 1 includes a light source 2, an image forming part 3, and a polarization plate 4. The polarization plate 4 is, for example, an exit-side polarization plate 4a or an incident-side polarization plate 4b. The exit-side polarization plate 4a is disposed close to a side of the image forming part 3 where light from the light source exits, and the incident-side polarization plate 4b is disposed close to a side of the image forming part 3 where the light from the light source enters. Each of the exit-side polarization plate 4a and the incident-side polarization plate 4b converts incident light into linearly polarized light. The HUD device 1 further includes a mirror 6 and an exit window 7. In FIG. 1, an emission path L of image light including the light emitted from the light source 2 is illustrated by a single dot chain arrow. A heat source for heating the polarization plate 4 is, for example, the light from the light source 2 and externally entering light.

Conventionally, in an image display device such as a projector device (PJ device) or a head-up display device (HUD device), a polarization plate is used as an optical element. A polarization plate is disposed close to a side of a liquid crystal panel where light from a light source enters and another polarization plate is disposed close to a side of the liquid crystal panel where the light from the light source exits. Each polarization plate has a function to convert the incident light into linearly polarized light in a predetermined direction.

A conventional polarization plate has a configuration in which a polarization film made of an organic material such as polyvinyl alcohol (PVA) containing iodine and dye is sandwiched between transparent substrates such as glass substrates or is attached to a transparent substrate. However, such a polarization plate formed of an organic material is poor in heat resistance. Thus, when being used in an environment at 70° C. or above, the polarization plate is deteriorated, resulting in degradation of the polarization function.

Some polarization plates include a wire grid polarizer that converts incident light into linearly polarized light, using a diffraction phenomenon at a protrusion (hereinafter, referred to as a thin metal wire) formed of a fine linear piece of metal higher in heat resistance than an organic material and disposed in a stripe pattern on a surface of a transparent substrate. Thus, the use of highly heat-resistant material enables suppression in deterioration of the polarization plate.

A polarization plate having such a wire grid polarizer functions when a length between adjoining thin metal wires is quite small as compared with a wavelength of incident light. Development of nanofabrication techniques has brought out a polarization plate using a wire grid polarizer available for use in a visible light region, and an application of the polarization plate for use in a projector exposed to high temperature is under study.

With a demand for smaller size, higher definition, and higher brightness of an image display device, and an increase in output from a light source accompanied with the demand, heat resistance has increasingly been required of a polarization plate. In a case of a device for outdoor use, such as an on-vehicle HUD device, heat generated by incident sunlight is another concern in addition to heat from a light source.

A polarization plate using a wire grid polarizer is advantageous in heat resistance higher than an organic material. However, due to a laminated structure of a thin metal wire, having a small thickness and a narrow width, and a transparent substrate, the polarization plate may undergo breakage at a change in temperature, as a result of difference in thermal expansion coefficient between the thin metal wire and the transparent substrate.

Figure 2A:
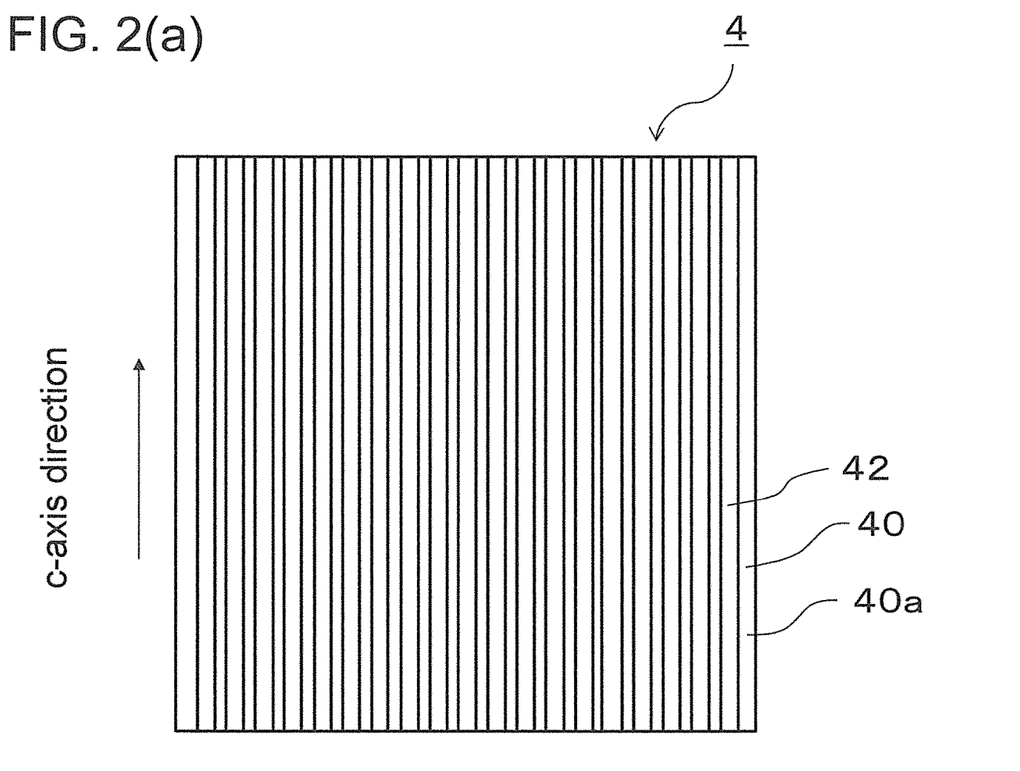
FIGS. 2(a) and 2(b) are schematic diagrams of the polarization plate according to the first embodiment.
Figure 2B:
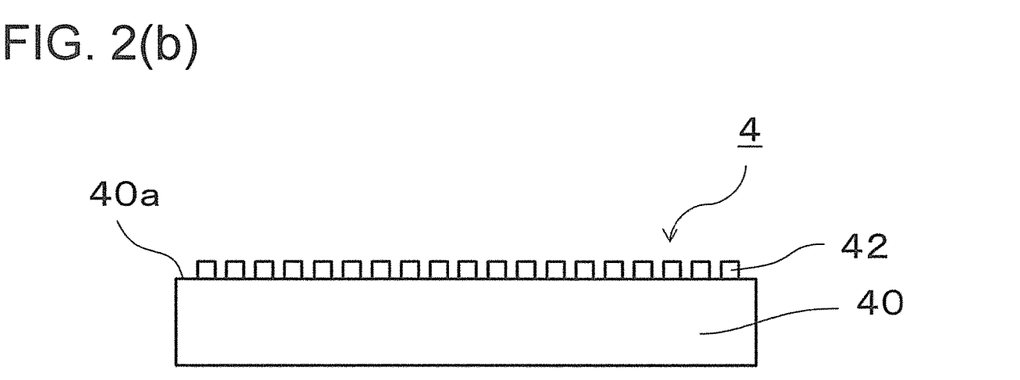

As illustrated in FIGS. 2(a) and 2(b), the polarization plate 4 of the present disclosure includes a sapphire plate 40 having a first main surface 40a, and a polarizer including a plurality of thin metal wires 42 arranged linearly and spaced from each other on the first main surface 40a of the sapphire plate 40. Each of the thin metal wires 42, for example, has a height of approximately 50 to 500 nm and a width of approximately 30 to 150 nm, and a length between adjoining two of the thin metal wires 42 is approximately 60 to 300 nm. The thin metal wires 42 extend in a longitudinal direction.

With the length between adjoining two of the thin metal wires 42 being set shorter than a wavelength of transmitted light, the polarization plate 4 performs the function to convert the transmitted light to linearly polarized light.

Each of the thin metal wires 42 disposed on the first main surface 40a of the sapphire plate 40 is made of, for example, aluminum having a thermal expansion coefficient of $23 \times 10^{-6}/°$ C., or copper having a thermal expansion coefficient of $16.8 \times 10^{-6}/°$ C. The thin metal wires 42 may be formed through, for example, the following processes.

First, a metal film coating is applied to the first main surface 40a of the sapphire plate 40 by a film forming method such as vapor deposition or sputtering. A resist pattern is then formed on the metal film by application, exposure, and development of a resist film on the metal film. Next, the metal film is etched, by use of an etchant, into stripes spaced from each other with a certain length, and then the metal film undergoes removal of the resist pattern and washing. As a result, the thin metal wires 42 are formed.

Sapphire is a single crystal of aluminum oxide (chemical formula: $Al_2O_3$). In addition to being highly resistant to heat, sapphire excels in thermal conductivity and heat dissipation, and thus is less prone to be increased in temperature.

Sapphire has, at temperature of 40° C. to 400° C., a thermal expansion coefficient of 7.0 to $7.7 \times 10^{-6}/°$ C. Sapphire has a thermal expansion coefficient within the range above, for the reason that sapphire is a material having an anisotropy for thermal expansion coefficient. For example, when aluminum is used for the thin metal wires 42, a difference in thermal expansion coefficient between sapphire and aluminum is 15.3 to $16 \times 10^{-6}/°$ C.

A change in temperature of the polarization plate 4 induces expansion or contraction of the sapphire plate 40 and the thin metal wires 42. Then, a difference in thermal expansion coefficient between the sapphire plate 40 and the thin metal wires 42 causes stress between the sapphire plate 40 and the thin metal wires 42 in accordance with a variation of the temperature. The stress increases as the difference in thermal expansion between the sapphire plate 40 and the thin metal wires 42 increases, and also increases as a length of contact between the sapphire plate 40 and each of the thin metal wires 42 increases.

Therefore the difference in thermal expansion between the sapphire plate 40 and the thin metal wires 42 in the longitudinal direction of the thin metal wires 42 may preferably be reduced for reducing the stress between the sapphire plate 40 and the thin metal wires 42.

FIGS. 5(a) to 5(d) each illustrate a crystal structure of sapphire used for the sapphire plate 40 in the polarization plate 4 of the present disclosure. As illustrated in FIGS. 5(a) to 5(d), sapphire has representative crystal planes, such as a c-plane, an m-plane, an a-plane, and a r-plane. Axes perpendicular to these crystal planes will be respectively referred to as a c-axis, an m-axis, an a-axis, and a r-axis.

Sapphire has, at temperature of 40° C. to 400° C., a thermal expansion coefficient of $7.0 \times 10\%^{6}/°$ C. in a direction perpendicular to the c-axis of sapphire, and a thermal expansion coefficient of $7.7 \times 10\%^{6}/°$ C. in a direction parallel to the c-axis of sapphire. In other words, the thermal expansion coefficient of sapphire in the direction parallel to the c-axis is approximately 10% larger than the thermal expansion coefficient of sapphire in the direction perpendicular to the c-axis. Thus, in the direction parallel to the c-axis, sapphire has a relatively small difference in thermal expansion coefficient from the thin metal wires 42.

Accordingly, the thermal expansion coefficient of the sapphire plate 40 in the longitudinal direction of the thin metal wires 42 is set at $7.7 \times 10\%^{6}/°$ C. in such a manner that the c-axis of the sapphire plate 40 is aligned with the longitudinal direction of the thin metal wires 42.

This value is the largest value as to the thermal expansion coefficient of sapphire, and enables minimization of the difference in thermal expansion coefficient between the sapphire plate 40 and the thin metal wires 42 in the longitudinal direction of the thin metal wires 42.

The polarization plate 4 of the present disclosure has an angle of 5° or less between the c-axis of the sapphire plate 40 and the longitudinal direction of the thin metal wires 42.

Figure 3A:
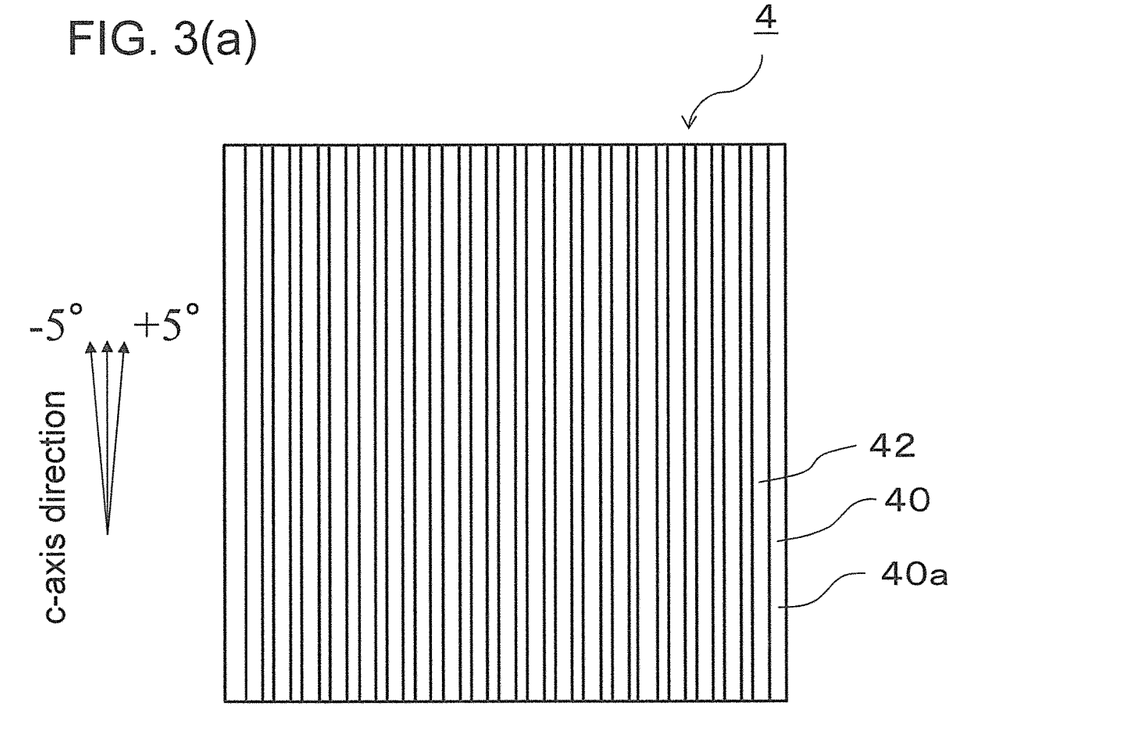
FIGS. 3(a) and 3(b) are schematic diagrams of the polarization plate according to the first embodiment.
Figure 3B:
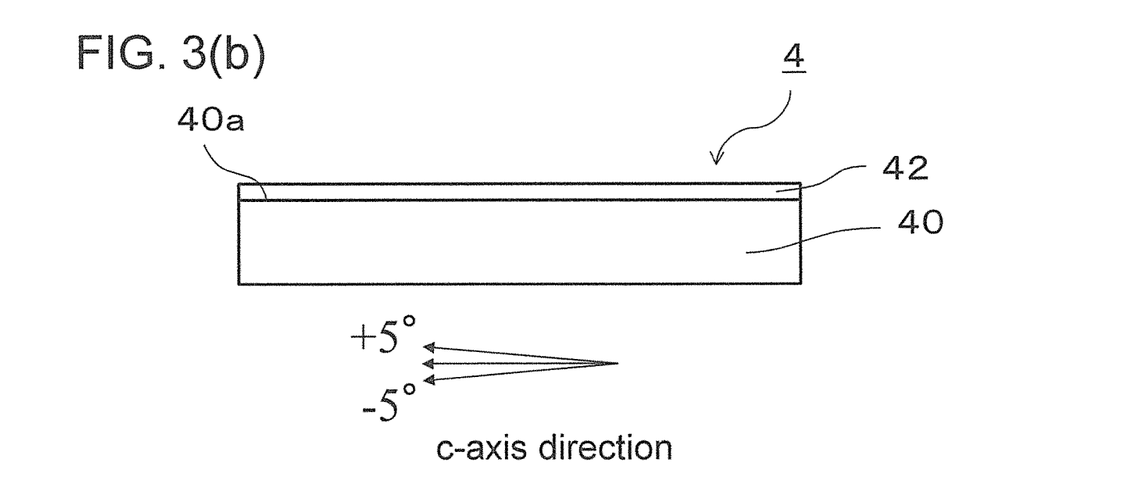

FIGS. 3(a) and 3(b) each illustrate an example in which the angle between the c-axis of the sapphire plate 40 and the longitudinal direction of the thin metal wires 42 is 5° or less. FIG. 3(a) illustrates an example in which the c-axis of the sapphire plate 40 is parallel to the first main surface 40a of the sapphire plate 40 and the angle between the c-axis of the sapphire plate 40 and the longitudinal direction of the thin metal wires 42 is 5° or less. The c-axis may deviate from the longitudinal direction of the thin metal wires 42, leftward or rightward within a range of ±5° on the drawing of FIG. 3(a). In FIG. 3(a), a direction of top to bottom corresponds to the longitudinal direction of the thin metal wires 42.

FIG. 3(b) is a side view of the polarization plate 4, and a direction of left to right in FIG. 3(b) corresponds to the longitudinal direction of the thin metal wires 42. In this case, the c-axis may deviate from the longitudinal direction of the thin metal wires 42, upward or downward within the range of ±5° on the drawing of FIG. 3(b).

This configuration enables a reduction in stress between the sapphire plate 40 of high rigidity and the thin metal wires 42. The polarization plate 4 is thus less prone to be broken even when a polarizer for a liquid crystal having an aspect ratio of 3:4 and a diagonal size of 1.8 to 3.1 inches is formed using the thin metal wires 42. When the polarizer in the size above is formed, each of the thin metal wires 42 has a length ranging from approximately 2.7 cm or more to approximately 4.7 cm or more, or has a length ranging from approximately 3.6 cm or more to approximately 6.3 cm or more, the length varying in accordance with the polarization direction.

The c-axis of the sapphire plate 40 is not necessarily completely aligned with the longitudinal direction of the thin metal wires 42. Even when the c-axis deviates from the longitudinal direction within the range of 5°, the configuration is adequately effective. When the deviation is 1° or less, the configuration is further effective.

An angle between the c-axis of the sapphire plate 40 and the first main surface 40a of the sapphire plate 40 may be 0.1° or more. In other words, the c-axis of the sapphire plate 40 may deviate upward or downward on the drawing.

In such a configuration, the deviation between the first main surface 40a of the sapphire plate 40 and the c-axis of the sapphire plate 40 causes a crystal plane to be inclined toward the first main surface 40a of the sapphire plate 40. As a result, a step structure, having a height of approximately several angstroms and a width of approximately several tens to several hundreds of angstroms, is formed on the main surface 40a of the sapphire plate 40. The c-axis of the sapphire plate 40 may deviate upward or downward at an angle of 0.5° or more on the drawing, so that the step structure is increased in size.

As the angle between the first main surface 40a of the sapphire plate 40 and the c-axis of the sapphire plate 40 increases, the step height increases, whereas the step width decreases. With the main surface 40a of the sapphire plate 40 having this step structure, in the process of film forming for the thin metal wires 42, the metal is easily brought into contact with the step portion without clearance to enable forming of even thickness film. In addition, the anchor effect improves adhesion between the first main surface 40a of the sapphire plate 40 and the thin metal wires 42.

With the high adhesion between the first main surface 40a of the sapphire plate 40 and the thin metal wires 42, even when the polarization plate 4 undergoes a repeated process of heating and cooling, the thin metal wires 42 are less prone to peel off the first main surface 40a. The step structure is sufficiently small as compared with a wavelength of visible light (400 to 800 nm), reducing an influence on optical properties of the polarization plate 1 to a hardly perceptible level.

The polarization plate 4 of the present disclosure may have an angle of 5° or less, preferably an angle of 2° or less between an axis perpendicular to the first main surface 40a of the sapphire plate 40 and the a-axis or the m-axis of the sapphire plate 40. This configuration enables incident image light into the main surface 40a of the sapphire plate 40 to be less birefringent.

Birefringence is a phenomenon that light, when passing through the object, is split into two beams in accordance with the polarization state due to an anisotropy for refractive index. For example, with respect to light having a wavelength of 589 nm, sapphire has a refractive index of 1.768 in the c-axis direction and a refractive index of 1.760 in the direction perpendicular to the c-axis. As to a birefringent material, a direction in which light is not split even when the light enters the material is referred to as an optical axis.

An optical axis for sapphire corresponds to the c-axis direction. When a light axis of the incident image light into the main surface 40a of the sapphire plate 40 is parallel or perpendicular to the optical axis (c-axis), the image light does not undergo birefringence.

When the main surface 40a of the sapphire plate 40 corresponds to the a-plane or the m-plane of sapphire, the light axis of the incident image light into the main surface 40a of the sapphire plate 40 is perpendicular to the optical axis (c-axis), and thus, the image light does not undergo birefringence. When the angle between the main surface 40a of the sapphire plate 40 and the a-plane or the m-plane of sapphire is 5° or less, preferably 2° or less, the birefringence is as minor as negligible.

When the angle between the axis perpendicular to the first main surface 40a of the sapphire plate 40 and the a-axis of the sapphire plate 40 is 0°, the first main surface 40a of the sapphire plate 40 corresponds to the a-plane of sapphire. Accordingly, when the angle between the axis perpendicular to the first main surface 40a of the sapphire plate 40 and the a-axis of the sapphire plate 40 is 5° or less, this state may also be referred to as a state in which the angle between the first main surface 40a of the sapphire plate 40 and the a-plane of sapphire is 5° or less.

When the angle between the axis perpendicular to the first main surface 40a of the sapphire plate 40 and the m-axis of the sapphire plate 40 is 0°, the first main surface 40a of the sapphire plate 40 corresponds to the m-plane of sapphire. Accordingly, when the angle between the axis perpendicular to the first main surface 40a of the sapphire plate 40 and the m-axis of the sapphire plate 40 is 5° or less, this state may also be referred to as a state in which the angle between the first main surface 40a of the sapphire plate 40 and the m-plane of sapphire is 5° or less.

Sapphire also has an anisotropy for strength, and the sapphire plate 40 exhibits the highest strength when a surface of the sapphire plate 40, corresponding to the a-plane, is subjected to stress. The sapphire plate 40 exhibits the second highest strength when a surface of the sapphire plate 40, corresponding to the m-plane, is subjected to stress. Since the c-plane is lower in strength than the a-plane and the m-plane, the first main surface 40a of the sapphire plate 40 preferably corresponds to the a-plane or the m-plane, instead of the c-plane, in order to suppress the breakage of the sapphire plate 40 and to cause the polarization plate 4 to be less susceptible to breakage.

The angle between the axis perpendicular to the first main surface 40a of the sapphire plate 40 and the a-axis or the m-axis of the sapphire plate 40 may alternatively be 0.1° or more, particularly preferably 0.5° or more. This configuration causes a crystal plane to be inclined toward the first main surface 40a of the sapphire plate 40, and the step structure, having the height of approximately several angstroms and the width of approximately several tens to several hundreds of angstroms, is thereby formed on the main surface 40a of the sapphire plate 40.

As the angle between the axis perpendicular to the first main surface 40a of the sapphire plate 40 and the a-axis or the m-axis of the sapphire plate 40 increases, the step height increases, whereas the step width decreases. With the main surface 40a of the sapphire plate 40 having this step structure, in the process of film forming for the thin metal wires 42, the metal is easily brought into contact with the step portion without clearance to enable forming of even thickness film. In addition, the anchor effect improves adhesion between the first main surface 40a of the sapphire plate 40 and the thin metal wires 42.

With the high adhesion between the first main surface 40a of the sapphire plate 40 and the thin metal wires 42, even when the polarization plate 4 undergoes a repeated process of heating and cooling, the thin metal wires 42 are less prone to peel off the first main surface 40a. The step structure is sufficiently small as compared with a wavelength of visible light (400 to 800 nm), reducing an influence on optical properties of the polarization plate 1 to a hardly perceptible level.

When the angle between the axis perpendicular to the first main surface 40a of the sapphire plate 40 and the a-axis or the m-axis of the sapphire plate 40 is 0.1° or more, a step structure with more uniform steps may be formed on the first main surface 40a of the sapphire plate 40 with ease in such a manner that the first main surface 40a is subjected to heat treatment or plasma treatment as pretreatment for forming the thin metal wires 42 on the first main surface 40a. With this step structure, the adhesion strength between the first main surface 40a and the thin metal wires 42 formed on the first main surface 40a is increased, and the variation in the adhesion strength is reduced. As the pretreatment, for example, the sapphire plate 40 may be subjected to heat treatment at a temperature of 800° C. or more, e.g., 1000° C. for approximately three hours.

It is possible to specify a relationship between the longitudinal direction of the thin metal wires 42 and the axes or surfaces of the sapphire plate 40 by using, for example, a crystal orientation measurement device with an X-ray diffraction method.

The crystal orientation measurement device, on a precondition that the polarization plate 4 is placed with the longitudinal direction of the thin metal wires 42 directed at a predetermined angle, irradiates the sapphire plate 40 with an X-ray to measure a typically called X-ray diffraction intensity that shows a state of crystal lattice of single crystal forming the sapphire plate 40. Then, based on the X-ray diffraction intensity measured, the crystal orientation measurement device specifies the relationship between the longitudinal direction of the thin metal wires 42 and the axes or the like of the sapphire plate 40.

A non-limiting example of an X-ray diffraction device is an automatic X-ray crystal orientation measurement device (Model No. 2991F2) manufactured by Rigaku Corporation.

As described above, the crystal orientation of the sapphire plate 40 is specified by an X-ray diffraction device, and the relationship between the crystal orientation and the thin metal wires 42 preferably corresponds to any one of those according to the present disclosure.

The sapphire plate 40 may have a thickness from 0.1 mm to 0.5 mm, both inclusive. This configuration causes the polarization plate 4 to have sufficient mechanical strength and heat dissipation properties.

Figure 4:
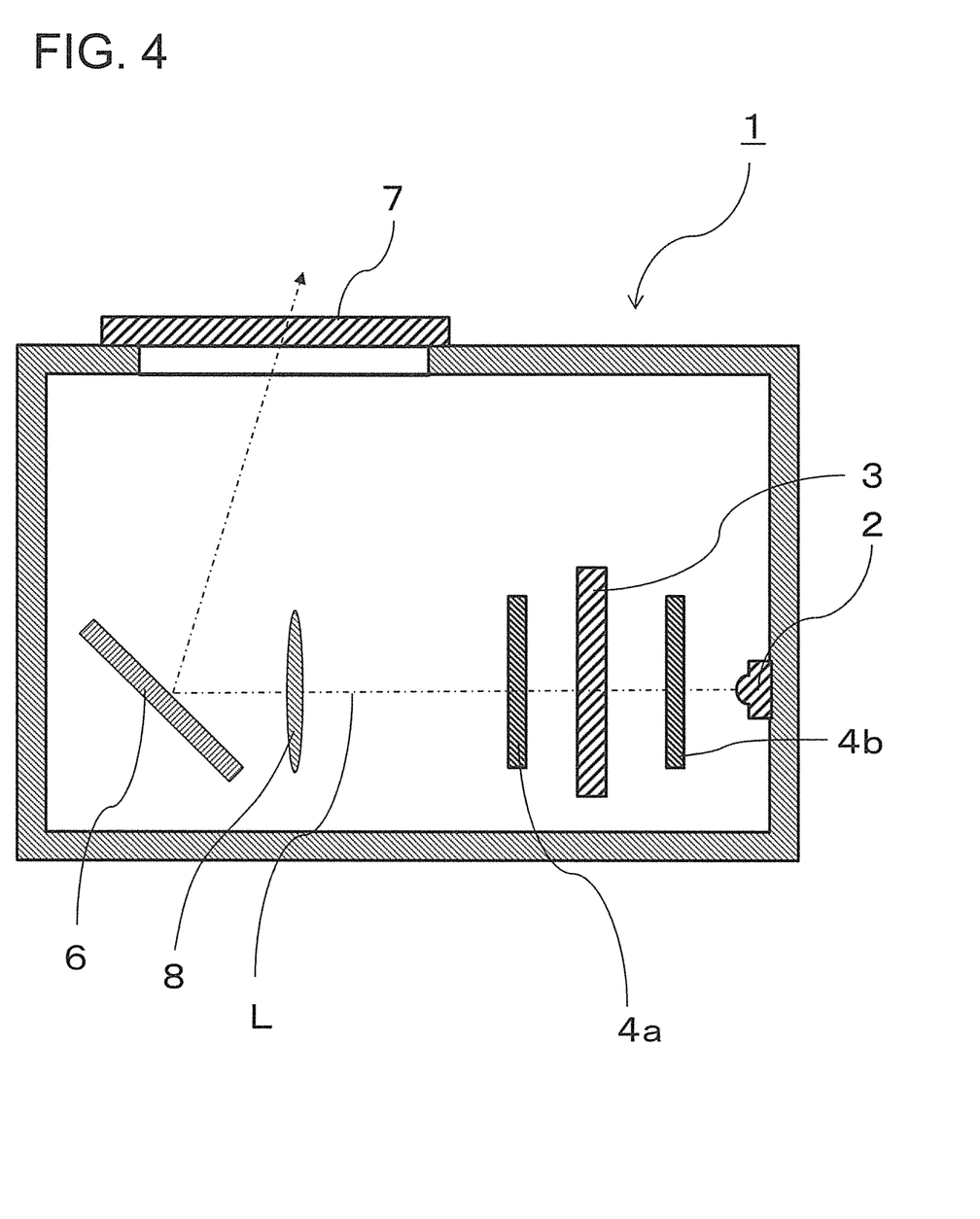
FIG. 4 is a schematic diagram of an image display device according to a second embodiment.
Figure 5A:
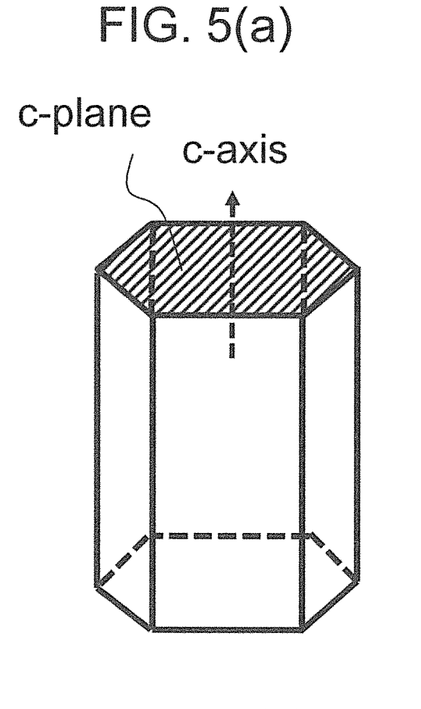
FIGS. 5(a) to 5(d) each illustrate a crystal structure of sapphire.
Figure 5B:
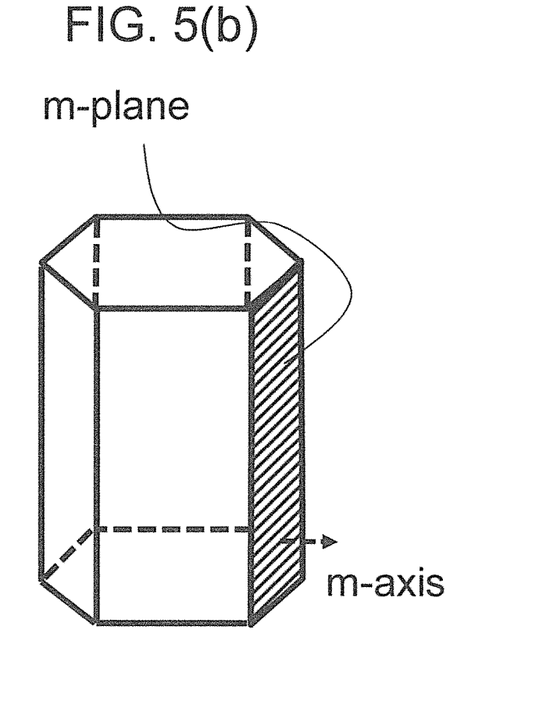
Figure 5C:
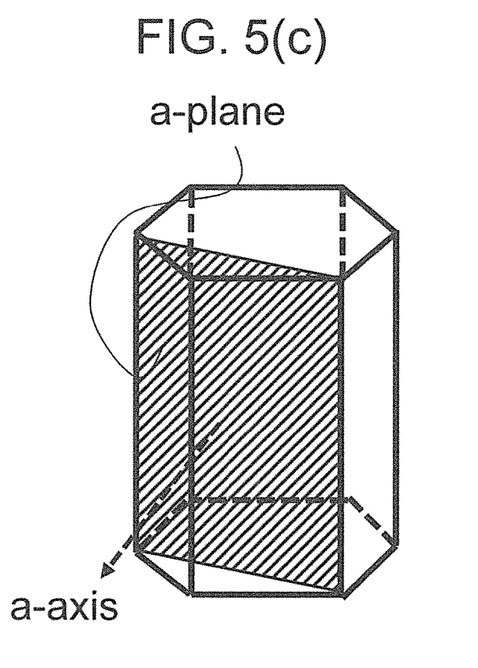
Figure 5D:
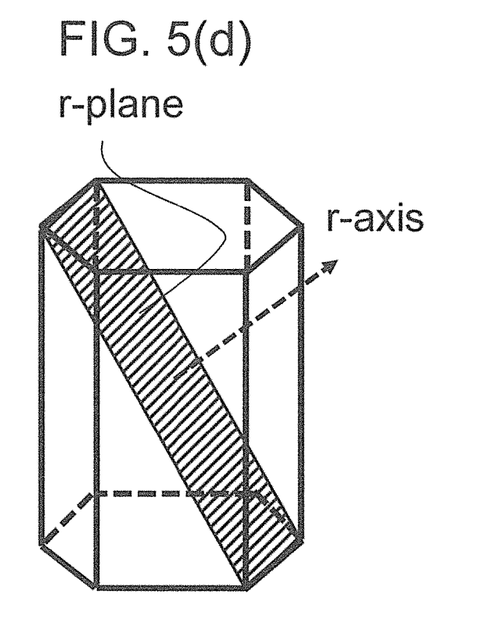

FIG. 4 illustrates a second embodiment in which a HUD device 1 includes a polarization plate 4, a mirror 6, and a light spreading member 8, such as a convex lens, between the polarization plate 4 and the mirror 6. When the HUD device 1 includes the light spreading member 8 between the polarization plate 4 and the mirror 6, the light spreading member 8 enables spreading of image light.

Further, in FIG. 1, the mirror 6 may be a concave mirror that concurrently fulfills a function of the light spreading member 8, which leads to a reduction in parts count.

In FIG. 1 and FIG. 4 illustrating the first embodiment and the second embodiment respectively, the HUD device 1 includes an incident-side polarization plate 4b allowing polarized light to enter a liquid crystal 3. Preferably, the incident-side polarization plate 4b includes thin metal wires 42 each of which is preferably formed of a material, such as aluminum or copper, higher in thermal conductivity than sapphire and is disposed on a side of the incident-side polarization plate 4b where light from a light source enters. This configuration further increases heat dissipation. When a main surface of a sapphire plate 40 corresponds to an a-plane or an m-plane of sapphire, a polarization direction of the incident light is changed in accordance with an angle between the polarization direction and a light axis (c-axis) of the crystal. When the polarization direction is parallel to the c-axis, the light exits from a rear surface of the incident-side polarization plate 4b while maintaining the polarization direction. In this embodiment, since the c-axis of sapphire is substantially parallel to a longitudinal direction of the thin metal wires 42, the light polarized by the thin metal wires 42 is emitted from the incident-side polarization plate 4b while maintaining the polarization direction, and then enters the liquid crystal 3.

An exit-side polarization plate 4a blocks, as to the light emitted from the liquid crystal 3, polarized light in a direction unrequired for image display. A combination in polarization direction of the incident-side polarization plate 4b with the exit-side polarization plate 4a is determined in accordance with a kind of the liquid crystal 3. For example, when a TN-type liquid crystal is used for the liquid crystal 3, the incident-side polarization plate 4b and the exit-side polarization plate 4a are each disposed to have the polarization direction rotated by 90°. In this embodiment, the longitudinal direction of the thin metal wires 42 is substantially parallel to the c-axis of sapphire. Therefore when the thin metal wires 42 are disposed on a side of the exit-side polarization plate 4a where the image light enters, the light polarized by the thin metal wires 42 is emitted from the exit-side polarization plate 4a, while maintaining the polarization direction.

The HUD device 1 may be designed such that the polarization plate 4 is cooled by air flow. The polarization plate 4 may be cooled by air flow, using an air blower such as a fan for air-cooling the polarization plate 4. Alternatively, the polarization plate 4 may be cooled by an air flow generated by movement of a mobile body such as a vehicle. Still alternatively, the polarization plate 4 may be connected to a cooling fin for an increase in the cooling effect. The cooling fin may be formed in at least a portion outside the range where the light is projected on the polarization plate 4.

As the sapphire plate 40 of the polarization plate 4, the use of a sapphire plate that attenuates light within a predetermined range of wavelength, such as ultraviolet light, as to the light projected on the polarization plate 4 enables suppression of damage to various optical members such as an image forming part 3 and a wavelength plate, the damage being caused by external light. For example, the sapphire plate 40 may have a transmittance within a wavelength range of 200 to 400 nm that is lower in average value than a transmittance within a wavelength range of 400 to 800 nm. The sapphire plate 40, when being configured as described above, attenuates light in a typically called ultraviolet light region, and thus enables suppression of damage to various optical members such as the image forming part 3 and the wavelength plate, the damage being caused by ultraviolet light in the sunlight entering the HUD device.

Alternatively, the sapphire plate 40 may have an absorption band within a wavelength range of 205 to 260 nm. It is possible to manufacture sapphire that has an absorption band in the ultraviolet light region and reduces the ultraviolet light, by maintaining an atmosphere during crystal growth of the sapphire or during heat treatment after the crystal growth as a controlled reducing atmosphere, and by introducing a defect caused by oxygen vacancy into the sapphire. Sapphire having the defect caused by oxygen vacancy has defects called an F center and an F+ center. The F center has an absorption band at 205 nm, and the F+ center has an absorption band at 210 nm, 230 nm, and 260 nm. The use of the sapphire plate 40 having the absorption band within the wavelength range of 205 to 260 nm enables attenuation of the ultraviolet light entering the HUD device 1.

As described above, the polarization plate 4 of the present disclosure is preferable for use in the HUD device 1 for use in a mobile body, the HUD device 1 being frequently exposed to external light such as sunlight. The mobile body is, for example, a vehicle, and also includes a ship or an airplane. The sunlight herein is not only the sunlight itself, but also includes sunlight passing through a vehicle window.

The image display device 1 of the present disclosure is less prone to be broken so that a mobile body provided with the image display device 1 is of higher reliability.

The forgoing description concerns a polarization plate 4, an image display device 1 using the polarization plate 4, and a mobile body according to embodiments of the present disclosure; however, the present disclosure is not limited to the embodiments, and thus various modifications and changes may be made without departing from the scope of the present disclosure.

The polarization plate 4 may be configured to convert incident light into linearly polarized light, using a diffraction phenomenon at a protrusion formed of a fine linear piece of metal and disposed in a stripe pattern on the main surface 40a of the sapphire plate 40. Alternatively, the polarization plate 4 may be a laminate of a dielectric layer and an inorganic fine particle layer on a reflective layer formed of thin-film metal strips spaced apart from each other with a certain length on the first main surface 40a of the sapphire plate 40. The image display device 1 may be a PJ device. The HUD device 1 may be configured to cause a user to perceive a virtual image appearing in front of or behind the mirror or in front of or behind the window.

Particularly, as in the HUD device 1 for use in a vehicle, in a case of the image display device 1 for outdoor use, the sunlight enters the HUD device 1, and possibly is condensed by a mirror or a lens disposed on a path of image light to reach the exit-side polarization plate 4a. When the exit-side polarization plate 4a is heated by the sunlight condensed, the exit-side polarization plate 4a may undergo functional degradation or breakage. According to the present disclosure, even in the HUD device 1 for outdoor use, the exit-side polarization plate 4a is less susceptible to breakage, and the functional degradation of the exit-side polarization plate 4a caused by the sunlight is reduced.

DESCRIPTION OF THE REFERENCE NUMERAL

1: Image display device (HUD device)
2: Light source
3: Image forming part (liquid crystal)
4: Polarization plate
4a: Exit-side polarization plate
4b: Incident-side polarization plate
L: Emission path of image light
6: Mirror
7: Exit window
8: Light spreading member (lens)
40: Sapphire plate
40a: First main surface
42: Thin metal wire

The invention claimed is:

1. A polarization plate comprising:
a sapphire plate having a first main surface; and
a thin metal wire disposed in a stripe pattern on the first main surface of the sapphire plate,
wherein an angle between a c-axis of the sapphire plate and a longitudinal direction of the thin metal wire is 5° or less,
wherein the sapphire plate has an average value of a transmittance within a wavelength range from 200 to 400 nm, the average value being lower than an average value of a transmittance within a wavelength range from 400 to 800 nm.

2. The polarization plate according to claim 1, wherein an angle between the first main surface of the sapphire plate and the c-axis of the sapphire plate is 0.1° or more.

3. The polarization plate according to claim 1, wherein an angle between an axis perpendicular to the first main surface of the sapphire plate and an a-axis or an m-axis of the sapphire plate is 5° or less.

4. The polarization plate according to claim 1, wherein an angle between an axis perpendicular to the first main surface and an a-axis or an m-axis of the sapphire plate is 0.1° or more.

5. The polarization plate according to claim 1, wherein the sapphire plate has a thickness from 0.1 mm or more and 0.5 mm or less.

6. The polarization plate according to claim 1, wherein the thin metal wire has a length of 27 mm or more.

7. The polarization plate according to claim 6, wherein the thin metal wire has a length of 63 mm or more.

8. The polarization plate according to claim 1, wherein the sapphire plate has an absorption band within a wavelength range from 205 to 260 nm.

9. An image display device comprising the polarization plate according to claim 1.

10. A mobile body comprising the image display device according to claim 9.

11. A polarization plate comprising:
a sapphire plate having a first main surface; and
a thin metal wire disposed in a stripe pattern on the first main surface of the sapphire plate,
wherein an angle between a c-axis of the sapphire plate and a longitudinal direction of the thin metal wire is 5° or less,
wherein the sapphire plate has an absorption band within a wavelength range from 205 to 260 nm.

12. The polarization plate according to claim 11, wherein an angle between the first main surface of the sapphire plate and the c-axis of the sapphire plate is 0.1° or more.

13. The polarization plate according to claim 11, wherein an angle between an axis perpendicular to the first main surface of the sapphire plate and an a-axis or an m-axis of the sapphire plate is 5° or less.

14. The polarization plate according to claim 11, wherein an angle between an axis perpendicular to the first main surface and an a-axis or an m-axis of the sapphire plate is 0.1° or more.

15. The polarization plate according to claim 11, wherein the sapphire plate has a thickness from 0.1 mm or more and 0.5 mm or less.

16. The polarization plate according to claim 11, wherein the thin metal wire has a length of 27 mm or more.

17. The polarization plate according to claim 16, wherein the thin metal wire has a length of 63 mm or more.

18. An image display device comprising the polarization plate according to claim 11.

19. A mobile body comprising the image display device according to claim 18.

* * * * *